Sept. 1, 1953  C. A. MATHENY ET AL  2,650,418
METHOD OF MAKING COLLARED SHAFTS
Filed March 31, 1949
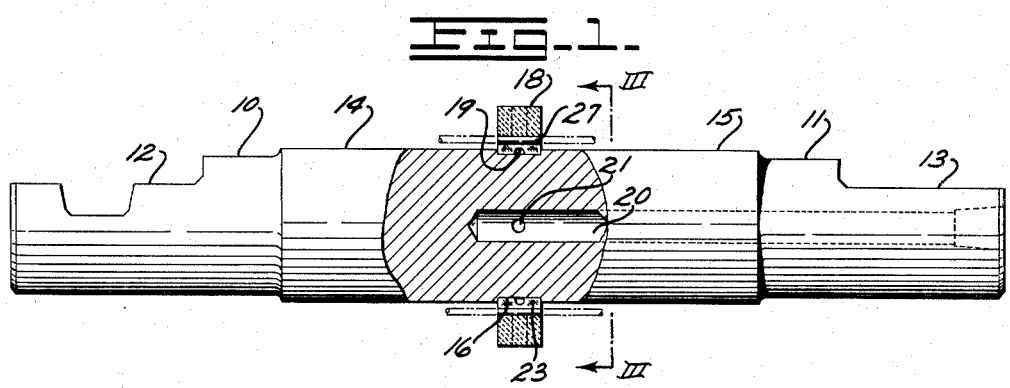
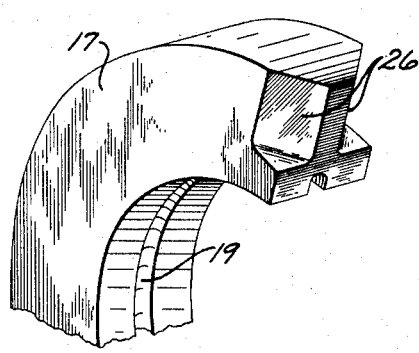
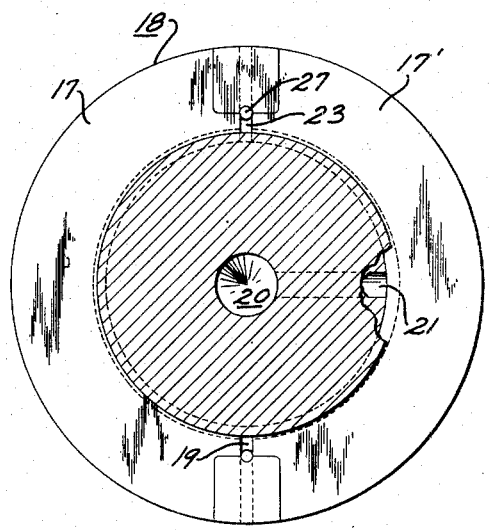
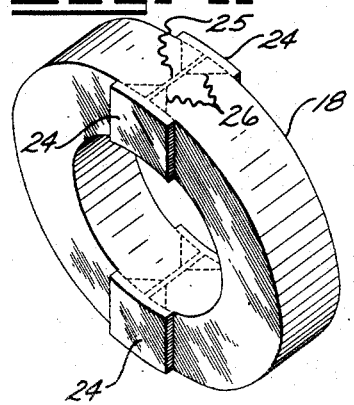
INVENTORS.
Clella A. Matheny
BY William J. Myers
Charles M. Fryer
ATTORNEY.

Patented Sept. 1, 1953

2,650,418

UNITED STATES PATENT OFFICE 2,650,418

METHOD OF MAKING COLLARED SHAFTS

Clella A. Matheny, Peoria, and William J. Myers, Eureka, Ill., assignors to Caterpillar Tractor Co., Peoria, Ill., a corporation of California Application March 31, 1949, Serial No. 84,594

4 Claims. (Cl. 29—148)

This invention relates to the method of making a shaft with a thrust collar intermediate its ends.

In a shaft having a collar intermediate its ends, it is conventional practice either to machine the shaft from a solid bar, the diameter of which is necessarily larger than the diameter of the finished collar or to forge a raised collar on a shaft and then machine to the finished dimensions. In either case, it is necessary to remove an excessive amount of material during machining. Also during heat treatment of such a shaft, the most practical method in the past has been to harden the cylindrical portion of the shaft separate from the thrust faces of the collar to prevent cracking at the joining edge between the collar and shaft. This practice results in an area on both the collar and shaft adjacent their intersection as well as the central portion of the shaft immediately under the collar being drawn to a relatively low degree of hardness thus decreasing the strength and rigidity of the shaft.

It is, therefore, an object of this invention to provide a shaft having a collar intermediate its ends of improved design requiring a minimum of stock removal to fabricate and a method of making the same. Another object of this invention is to provide a collared shaft permitting a simplified heat treatment resulting in a shaft of improved strength and rigidity. Another object of the invention is the manufacture of a collared shaft with less material and at a lower cost than has heretofore been possible. Other objects and advantages of this invention will be apparent in the following specification wherein reference is made to the accompanying drawings.

For purposes of illustration, this invention is disclosed in its application to a shaft of the type commonly employed for supporting track rollers adapted to guide the endless track mechanism of a track type tractor. It will be apparent from the disclosure, however, that the invention is not limited to this use but is capable of application in many fields.

In the drawings:

Fig. 1 is a view in side elevation of a shaft made in accordance with the present invention with portions broken away to more clearly illustrate its construction;

Fig. 2 is an isometric view of a part of one of the segments making up the thrust collar shown on the shaft in Fig. 1;

Fig. 3 is a transverse sectional view taken along the line III—III of Fig. 1; and Fig. 4 is an isometric view of the collar blank before machining.

Fig. 1 illustrates a track roller shaft of the type commonly employed for supporting a track roller (not shown) but which is adapted to engage the endless track mechanism of a track type tractor or the like. The shaft is provided with end portions 10 and 11 of reduced diameter having cutout portions 12 and 13 provided therein to facilitate clamping of the shaft to a suitable support. The shaft is provided with a pair of spaced journal surfaces 14 and 15 separated by an annular recess 16. The recess is provided for the reception of a pair of semi-circular segments 17 and 17', the ends of which are joined together as by welding to form an annular thrust collar 18. The inner diameter of the collar is provided with an annular groove 19 which is adapted to register with lubricant passages 20 and 21 provided in the shaft. Openings 23 extending transversely across the inside surface of the collar permit lubricant in the annular groove 19 to be distributed to the journal surfaces 14 and 15.

In the manufacture, the shaft may be machined from bar stock which is then induction hardened to provide a uniform hardened case on the bearing journals 14 and 15, as well as the groove 16. The collar 18 is made from a coin pressed blank illustrated in Fig. 4 of low carbon material having a pair of diametrically opposed raised lugs 24 provided on each face and a slight excess of material on its inner and outer diameters. The collar is first carburized to an even depth, then the raised lugs 24 are machined off and its bore and outside diameter are machined to size. Then the collar is hardened. The lugs are of such a size that the carbon content of the washer face immediately thereunder is not affected by the carburizing treatment and therefore remains relatively soft during hardening. Likewise the effect of the carburizing is removed by machining the inner and outer diameters. Areas of low carbon content are thus provided of sufficient size to permit the formation of a good welded joint which could not otherwise be formed in a material having a high carbon content. This also prevents the heat of welding from penetrating and cracking the high carbon area of the collar.

After hardening and removal of the lugs 24, the collar is cut in half as illustrated by the dotted lines 25 in Fig. 4 through its low carbon area, and the ends of the semicircular segments are chamfered as illustrated at 26 in Fig. 2 and by the dotted lines in Fig. 4. These semicircular segments 17 and 17' are then pressed into the annular groove 16 provided in the shaft with their ends spaced from each other a distance determined by the width of the cut 25. Short lengths of wire 27 are arranged in the spaces and serve as dams to prevent the molten weld material from closing the openings 23. After welding, the collar contracts, forming a tight fit with the shaft and the wires are cut to eliminate any excess length. The final operation is that of finish grinding the thrust faces of the collar 18.

This method of fabrication permits the central portion of the shaft to be hardened under the collar which is hardened separately before being secured to the shaft resulting in a combination of unusual strength and rigidity. The thrust faces of the collar are also adequately hardened to resist the wear of the thrust forces to which it is subjected. Furthermore through the construction and method herein described, the provision of channels for lubricant through the shaft and collar is facilitated and the cost of manufacture of a collared shaft is greatly reduced over that where conventional manufacturing processes are followed.

We claim:

1. The method of making a hardened collar for a shaft which comprises, surface carburizing a collar like blank of low carbon material having spaced lugs thereon, cutting away said lugs, then cutting the blank through the low carbon stock exposed by cutting away the lugs to form segments, and then welding the segments together about a shaft at their exposed low carbon portions.

2. The method of making a hardened collar for a shaft which comprises, surface carburizing a collar like blank of low carbon material having spaced lugs thereon, cutting away said lugs, then cutting the blank through the low carbon stock exposed by cutting away the lugs to form segments, and then welding the segments together about a shaft at their exposed low carbon portions, said lugs being of sufficient size to expose upon their removal sufficient low carbon material to effectively isolate the high carbon areas from the heat of welding.

3. The method of making a hardened collared shaft which comprises forming a shaft with a collar receiving groove and hardening it, then surface carburizing a collar like blank of low carbon material having spaced lugs thereon, cutting away said lugs to expose areas of low carbon content, hardening the collar and segmenting it by cutting through said low carbon areas, and then welding the segments together while received in the shaft groove with dams arranged between the ends welded to preserve open oil ducts through the collar adjacent the shaft.

4. The method of making a hardened collared shaft which comprises forming a shaft with a collar receiving groove and hardening it, then surface carburizing a collar like blank of low carbon material having spaced lugs thereon, cutting away said lugs and the inner and outer diameters of the collar to expose areas of low carbon content, hardening the collar and segmenting it by cutting through said low carbon areas, and then welding the segments together while received in the shaft groove with dams arranged between the ends welded to preserve open oil ducts through the collar adjacent the shaft.

CLELLA A. MATHENY.
WILLIAM J. MYERS.

References Cited in the file of this patent

UNITED STATES PATENTS

| Number | Name | Date |
|---|---|---|
| 1,297,129 | Emerson | Mar. 11, 1919 |
| 1,467,792 | Holmes | Sept. 11, 1923 |
| 1,498,748 | Pierce, Jr. | June 24, 1924 |
| 1,804,015 | Klocke | May 5, 1931 |
| 1,911,336 | Ackerman | May 30, 1933 |
| 1,930,277 | Lenz et al. | Oct. 10, 1933 |
| 1,958,681 | Sneed | May 15, 1934 |
| 1,971,433 | Tartkais | Aug. 28, 1934 |
| 2,282,537 | Whitney | May 12, 1937 |
| 2,219,085 | Watson | Oct. 22, 1940 |
| 2,371,399 | Mantle | Mar. 13, 1945 |
| 2,449,662 | Leeson | Sept. 21, 1948 |

OTHER REFERENCES

P. 509, 3rd par., Weld. Journal, June 1947. (Copy in Div. 14.)